United States Patent
McDonald et al.

(10) Patent No.: US 6,704,030 B1
(45) Date of Patent: Mar. 9, 2004

(54) METHOD AND APPARATUS FOR PROVISIONING TELECOMMUNICATIONS EQUIPMENT

(75) Inventors: David Ellis McDonald, Plaistow, NH (US); Shelley L Rosenbaum, Billerica, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 459 days.

(21) Appl. No.: 09/687,326

(22) Filed: Oct. 13, 2000

(51) Int. Cl.[7] .......................... G06F 3/14; G06F 15/16; G06F 11/00
(52) U.S. Cl. ............... 345/736; 345/735; 345/780; 345/853; 709/226; 709/223
(58) Field of Search ............................ 345/736, 735, 345/734, 780, 969, 853–854, 965, 970, 771, 738, 737, 809, 839; 709/223–224, 220–222, 225–228

(56) References Cited

U.S. PATENT DOCUMENTS

| | | | | |
|---|---|---|---|---|
| 5,452,415 A | * | 9/1995 | Hotka ........................ 345/735 |
| 5,761,432 A | * | 6/1998 | Bergholm et al. .......... 709/226 |
| 6,052,456 A | * | 4/2000 | Huang ..................... 345/854 X |
| 6,229,538 B1 | * | 5/2001 | McIntyre et al. ........... 345/734 |
| 6,389,464 B1 | * | 5/2002 | Krishnamurthy et al. ... 709/220 |
| 6,574,737 B1 | * | 6/2003 | Kingsford et al. ...... 709/224 X |

* cited by examiner

Primary Examiner—Raymond J. Bayerl

(57) ABSTRACT

A provisioning system includes an interactive display that provides graphical feedback to a craft worker, or user. The interactive display indicates to the user possible provisioning schemes and may also indicate actually provisioned paths. Graphical templates provide a visual indication of provisioning topologies and a variety of interactive display techniques, such as pull down menus, dialog boxes, color coding, icons, and affordances, for example, may be employed in conjunction with the graphical templates to provide visual cues regarding network provisioning to a user. A wizard may be employed to step a user through the provisioning process.

16 Claims, 19 Drawing Sheets

Test Access Wizard - WaveStar_Bandwidth_Manager - Test

Screen 1

Select a shelf, pack, port or trib with the "Browse" button and then select the test access session you want to modify in the table. Then click on the "Next" button. Click "View Details" for the test access session topology.

AID: 1-1    [Browse]

| Primary Trib | Secondary Trib | Rate | Mode | E Tributary | E Out Mode | F Tributary | F Out Mode |
|---|---|---|---|---|---|---|---|
| 1-1-#-#-01-1-1 | 1-1-#-#-01-8-1 | STS1 | MONEF | 1-1-u-#-08-1-10 | AIS | 1-1-u-#-08-1-11 | IDLE/UNEQ |
| 1-1-#-#-01-2-1 | - | STS1 | MONE | 1-1-u-#-08-1-14 | - | - | - |
| 1-1-#-#-01-3-1 | - | STS1 | SPLTE | 1-1-u-#-08-1-15 | AIS | 1-1-u-#-08-1-16 | - |
| 1-1-#-#-01-4-1 | 1-1-#-#-01-7-1 | STS1 | SPLTEF | 1-1-u-#-10-1-1 | NORM | 1-1-u-#-10-1-2 | AIS |

[< Back]  [Next >]  [View Details]    [Cancel]  [Help]

FIG. 13

Source Tributary

First select the port in the left table and then select the tributary in the right table. Then click the "Select" button.

Enter AID: 1-1-u-#-06-1

- WaveStar BandWidth Mana
  - Bay sc
  - Bay sw1
  - Bay sw2
  - Bay 1
    - Shelf 1 (2.5G I/O)
      - 4F BLSR f1 2
      - 2F BLSR t04
      - 1 + 1 Optical o02
      - 1 + 1 Optical o03
      - Unprot Port 06-1 (O
      - Unprot Port 08-1 (O
      - Unprot Port 10-1 (O Equipment \ Ptn Grp / Ring ID

| Tributary | Avbl | Prot | Rsvd |
|---|---|---|---|
| 1-1-u-#-06-1-1 | YES | NO | NO |
| 1-1-u-#-06-1-2 | YES | NO | NO |
| 1-1-u-#-06-1-3 | YES | NO | NO |
| 1-1-u-#-06-1-4 | YES | NO | NO |
| 1-1-u-#-06-1-5 | YES | NO | NO |
| 1-1-u-#-06-1-6 | YES | NO | NO |
| 1-1-u-#-06-1-7 | YES | NO | NO |
| 1-1-u-#-06-1-8 | YES | NO | NO |
| 1-1-u-#-06-1-9 | YES | NO | NO |
| 1-1-u-#-06-1-10 | YES | NO | NO |
| 1-1-u-#-06-1-11 | YES | NO | NO |
| 1-1-u-#-06-1-12 | YES | NO | NO |
| 1-1-u-#-06-1-13 | YES | NO | NO |
| 1-1-u-#-06-1-14 | YES | NO | NO |
| 1-1-u-#-06-1-15 | YES | NO | NO |
| 1-1-u-#-06-1-16 | YES | NO | NO |
| 1-1-u-#-06-1-17 | YES | NO | NO |
| 1-1-u-#-06-1-18 | YES | NO | NO |

Select          Cancel

FIG. 20

METHOD AND APPARATUS FOR PROVISIONING TELECOMMUNICATIONS EQUIPMENT

FIELD OF THE INVENTION

The invention relates to telecommunications equipment and, more particularly, to the allocation, or provisioning, of telecommunications equipment.

BACKGROUND OF THE INVENTION

Telecommunications networks may include a myriad of network elements interconnected in extremely complex arrangements to provide communications among thousands, even millions, of subscribers. The network elements are typically housed in equipment buildings and are organized in bays within the building. Each bay may include several shelves of equipment, with each shelf including one or more circuit packs. Each circuit pack, in turn, may provide for communications through several included ports. Communications through each port may be divided into several tributaries and the type of communications may be further divided, for example, into "working" or "protection" categories. Provisioning such an arrangement can be an extraordinarily complicated process, with craft workers, charged with the responsibility of creating and modifying the communications paths that serve millions of people. In order, for example, to set up a test port for monitoring communications through a particular tributary, a craft worker might be forced to enter lengthy strings of alphanumeric data that indicate the bay, shelf, pack, port, working, or protection status for each of the tributaries involved. With strings of alphanumeric characters the only feedback afforded a craft worker, the craft worker may have difficulty determining whether they have entered the correct strings, thereby making the desired connections. Such data entry is fraught with the potential for error, and errors may, in addition to wasting a craft worker's time, cause catastrophic losses of communications links.

Given the complexity of interconnections within telecommunications systems, a system that provides for readily comprehensible indicia of telecommunications provisioning would therefore be highly desirable.

SUMMARY

A provisioning system in accordance with the principles of the present invention provides graphical feedback to a craft worker, or user, which indicates to the user possible provisioning schemes and may also indicate actually provisioned paths. A variety of interactive display techniques, such as pull down menus, dialog boxes, color coding, icons, and affordances, for example, may be employed in conjunction with the graphical templates to provide visual cues regarding network provisioning to a user. A wizard may be employed to step a user through the provisioning process, from one template to another.

In accordance with the principles of the present invention, a provisioning system may be employed in such provisioning applications as, for example, providing access to a test fixture or establishing a cross-connection. A variety of functions, that allow a user to create, modify, view, or delete provisioned paths for example, may be available to a user exercising any of the provisioning applications.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A database display system in accordance with the principles of the present invention provide readily comprehensible information regarding a telecommunications system to a display, such as a display that may support a craft worker involved in provisioning the telecommunications system. The system includes an output device, such as a cathode ray tube (CRT), liquid crystal display (LCD), or other display device, and a display controller. The display controller and display device operate in concert to display images that are representative of the telecommunications system's provisioning.

The displayed images depict such related telecommunications information as the identities and interconnectivity of network elements (NEs), within the system. The graphical interconnectivity information may be employed to indicate to a craft worker existing provisioned paths and possible provisioning schemes. The graphical representations of provisioning information may take the form of templates, for example, and a variety of interactive display techniques, such as pull down menus, dialog boxes, color coding, icons, and affordances, for example, may be employed in conjunction with the graphical templates to provide visual cues regarding network provisioning to a user. A wizard may be employed to step a user through the provisioning process, from one template to another.

Figure 1:
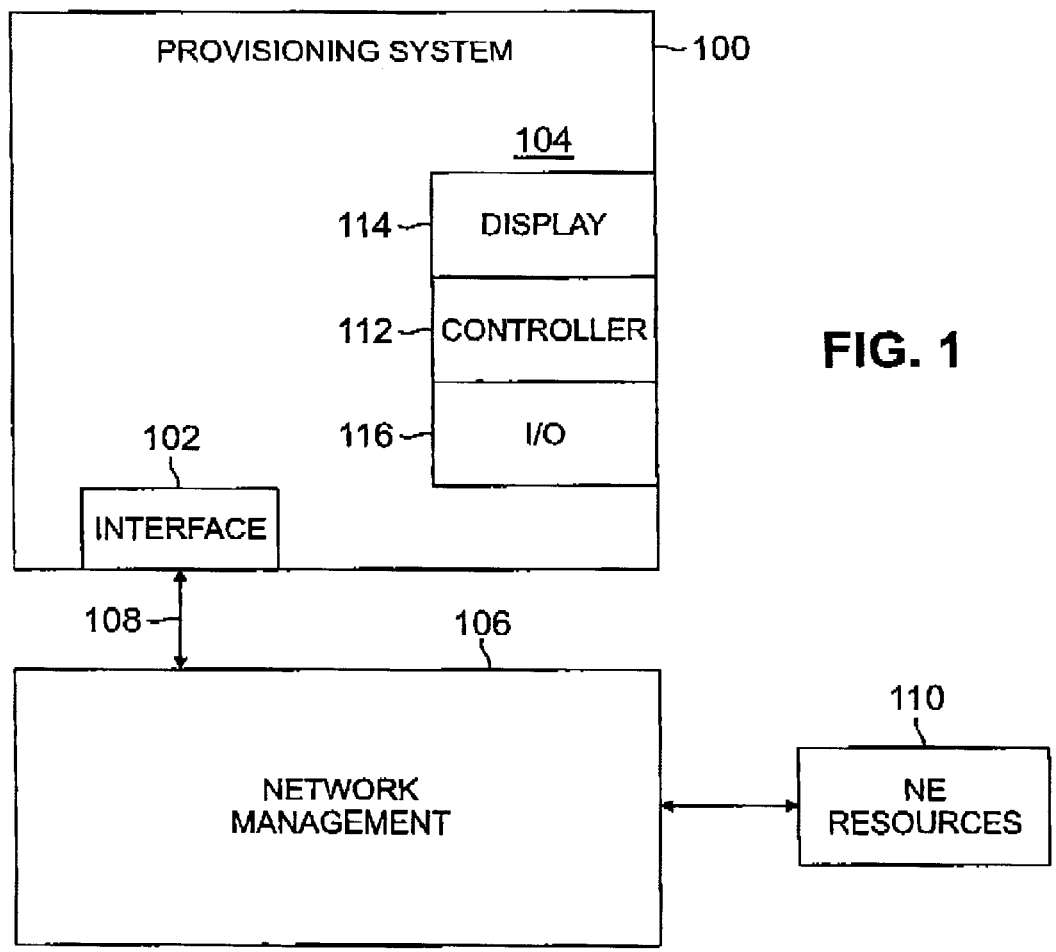
FIG. 1 is a conceptual block diagram of a provisioning system that includes a graphical user interface accordance with the principles of the present invention.

In accordance with the principles of the present invention, a provisioning system may be employed in such provisioning applications as, for example, providing access to a test fixture or establishing a cross-connect. A variety of functions that allow a user to create, modify, view, or delete provisioned paths for example, may be available to a user exercising any of the provisioning applications. A provisioning system 100 such as that illustrated in the conceptual block diagram of FIG. 1 includes one or more network management system interfaces 102 and a provisioning interactive display system 104 in accordance with the principles of the present invention. The interactive display system 104 may include a graphical user interface, network element information models for various types of network elements to be provisioned by the system, and network communications packages and protocols, such as CORBA, TCP/IP, or OSI Communications between the provisioning system 100 and a network management system 106 takes place over a communications link 108. The communications link 108 may take thee form of a high-speed local area network (LAN) connection, a standard computer bus interface, or other communications means.

Management exchange between the provisioning system 100 and network management system 106 may include information from the network management system indicating the currently provisioned status, which the provisioning system displays for analysis by a craft worker, for example. Additionally, the provisioning system 100, in response to a craft worker's commands, may transmit to the management system 106 instructions regarding a desired provisioning scheme whereby network element resources 110 are allocated. The provisioning system 100 includes an interactive display system 104 that includes a controller 112 that communicates with an interactive display 114 in a manner in accordance with the principles of the present invention. An input/output system 116 permits a craft worker to interact with the provisioning system 100, to query the network management system 102, to retrieve data from the network management system 102, and to adjust the display 114, for example. As will be described in greater detail in the discuss related to FIG. 2, the interactive display system 104 may include a variety of input and output devices, such as a mouse, keyboard, joystick, trackball, touch sensitive screen CRT, LCD, or plasma display, for example. In accordance with the principles of the present invention, the interactive display may be used by the provisioning system 100 to permit a craft worker to adjust the provisioning one or more network element resources 110, with the assistance of a network management system 102.

Figure 2:
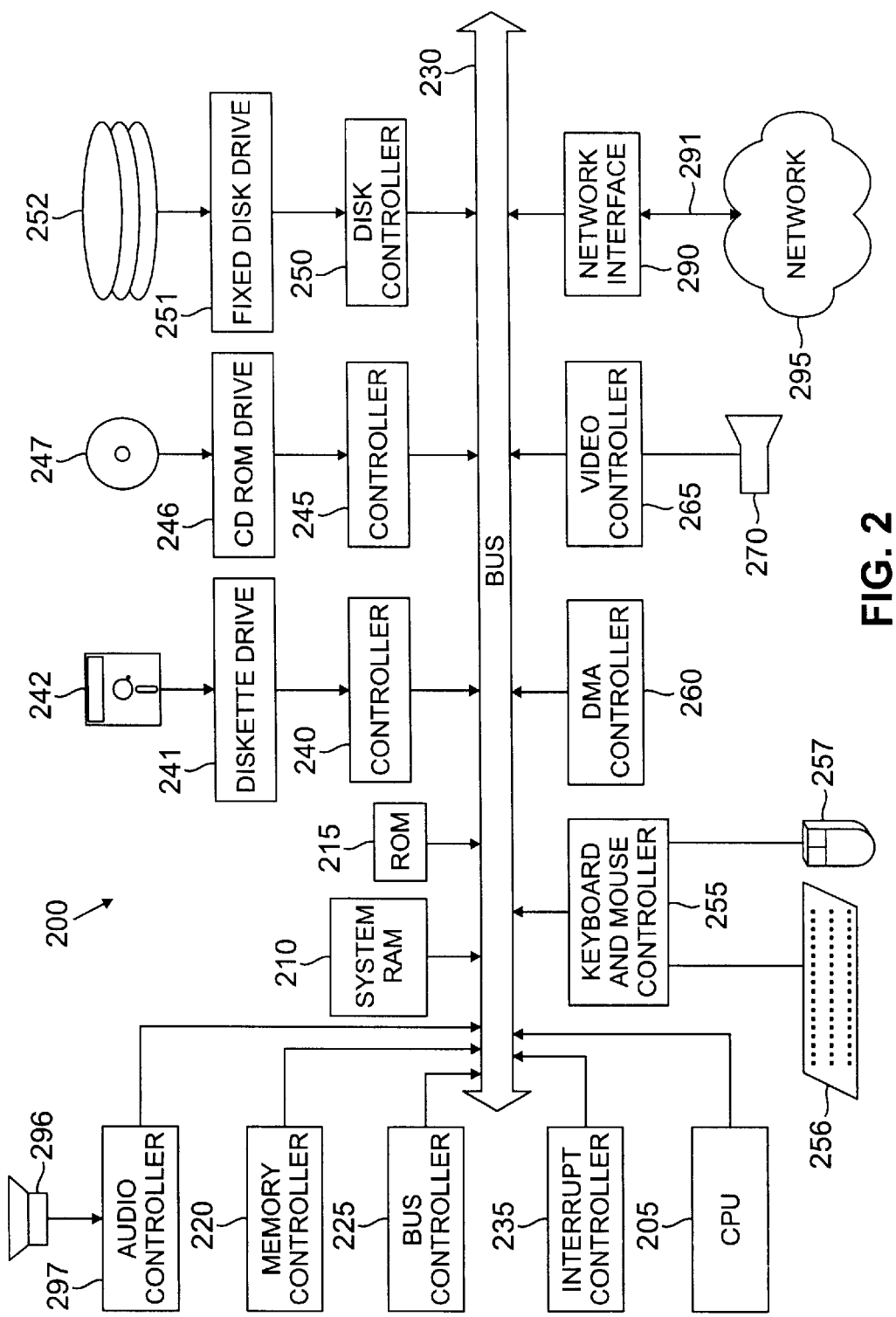
FIG. 2 is a conceptual block diagram of a computer system that may be used to display provision is information with the principles of the present invention.

FIG. 2 illustrates the system architecture for a computer system 200 on which the invention may be implemented. The exemplary computer system of FIG. 2 is for descriptive purposes only. Although the description may refer to terms commonly used in describing particular computer systems, the description and concepts equally apply to other systems, including system having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adaptor 290 which allows the system to be interconnected to a local area network (LAN) or a wide area network (WAN), schematically illustrated by bus 291 and network 295. An input interface (not shown) operates in conjunction with an input device (not shown) to permit a user to send information, whether command and control, data, or other types of information, to the system 200. The input device and interface may be any of a number of common interface devices, such as a joystick, a touch-pad, a touch-screen, a speech-recognition device, or other known input devices.

Operation of computer system 200 is generally controlled and coordinated by operating system software. The operating system controls allocation of system resources and performs tasks such as processing scheduling, memory management, networking, and I/O services, among things. In particular, an operating system resident in system memory and running on CPU 205 coordinates the operation of the other elements of computer system 200. The present invention may be implemented with any number of operating systems, including commercially available operating systems. One or more applications, such may also run on the CPU 205. If the operating system is a true multitasking operating system, multiple applications may execute simultaneously.

Figure 3:
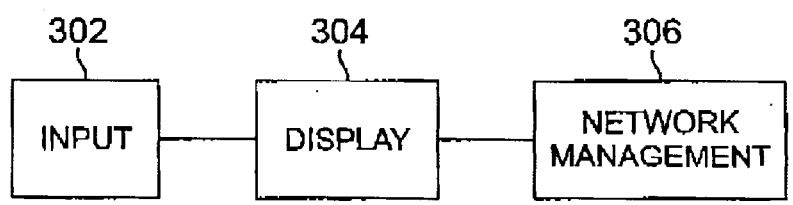
FIG. 3 is a conceptual block diagram of software components of an interactive provisioning system in accordance with the principles of the present invention.

FIG. 3 illustrates conceptually the main software components of an interactive telecommunications provisioning system in accordance with principles of the present invention. A craft worker's input engine 302 may include known user input device drivers, such as keyboard and mouse (with corresponding controllers), a joystick, touch pad, touch screen, voice-input device, etc, that may be implemented, for example, using object-oriented programming techniques. The new interactive display engine 304 may include drivers for various of the hardware components described in the discussion related to FIGS. 1 and 2, including that for a display 114. The display engine 304 accepts input from the craft worker's input interface 302 and from the network management system engine 308. In response to input from either the craft worker's input interface 302 or the network management engine 306, the display engine 304 produces output for the display 114, which may be formatted by an output engine (not shown). As will be discussed in greater detail below, the software elements of the system may be implemented using object-oriented programming techniques.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted is if they were a single item. Together, the attributes and methods enable objects to model virtually any realworld entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an additional function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse preexisting programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs. In accordance with the principles of the present invention, OOP, or other programming techniques may be employed to implement the representation functions discussed below.

Figure 4:
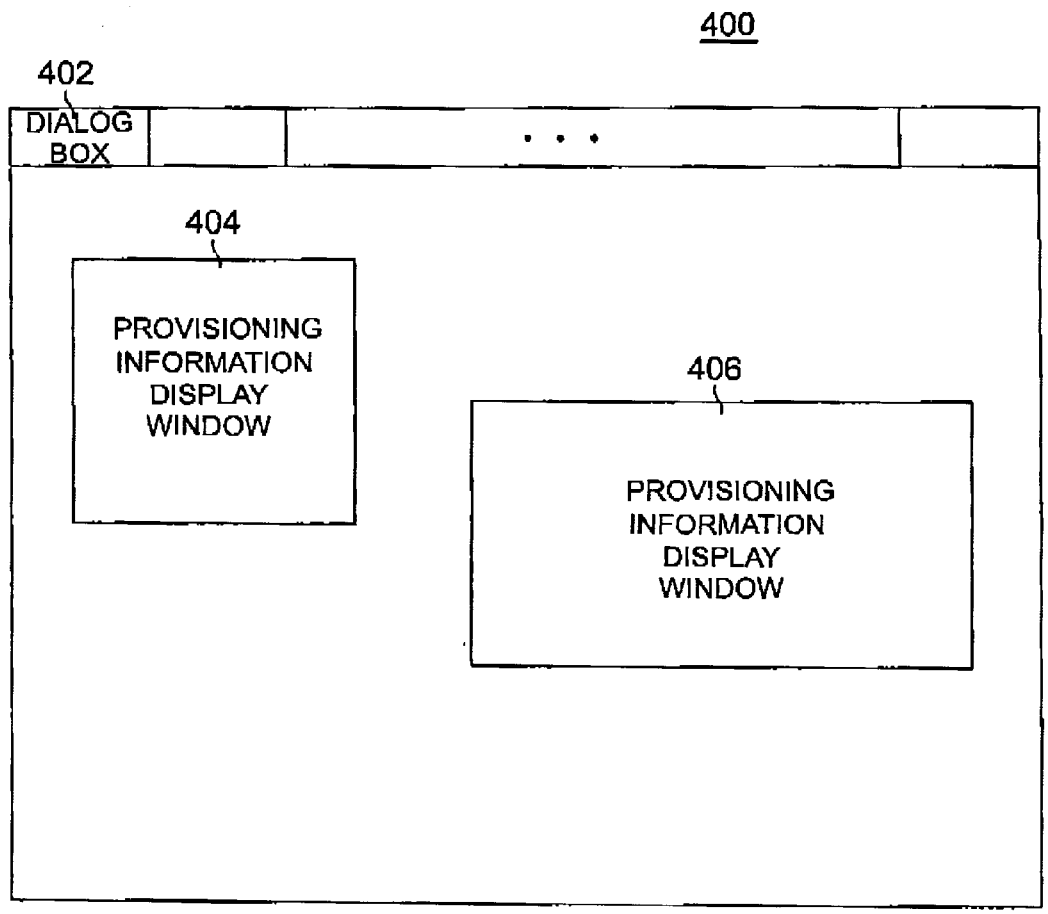
FIG. 4 is a conceptual diagram of an illustrative output screen that may be used in conjunction with art interactive provisioning system in accordance with the principles of the present invention.

In accordance with the principles of the present invention, a display may be employed to display summary database information that permits an analyst to quickly grasp pertinent characteristics of data stored in one or more databases that is to be analyzed. In the illustrative embodiment of FIG. 4 a display output, or "screen", 400 includes one or more dialog boxes 402. In this illustrative embodiment, the dialog boxes 402 afford a primary control interface for a craft worker. That is, each of the dialog boxes may provide access to the control of various display features. For example, a craft worker may activate a dialog box, by "clicking on" a box, to select among provisioning applications, such as cross-connect or test access, for example. The dialog boxes 402 may also provide keys for interpreting various attributes of displayed items, such as color, or shading, for example.

One or more windows, such as windows 404 and 406 may be created by the interactive display system to display provisioning information. In the illustrative example, windows 404 and 406 are rectangular, but windows of other shapes are contemplated within the scope of the invention. In operation, a craft worker may select the size, shape, and location of a window, long with the provisioning information to be displayed. Dialog boxes 402, and/or other interactive techniques, such as "click and drag" graphical techniques, may be employed to determine the size, shape, and location of interactive provisioning windows, such as windows 404 and 406. As will be described in greater detail below, windows such as 406 and 406 may include template displays which reflect existing or potential network element provisioning.

Figure 5:
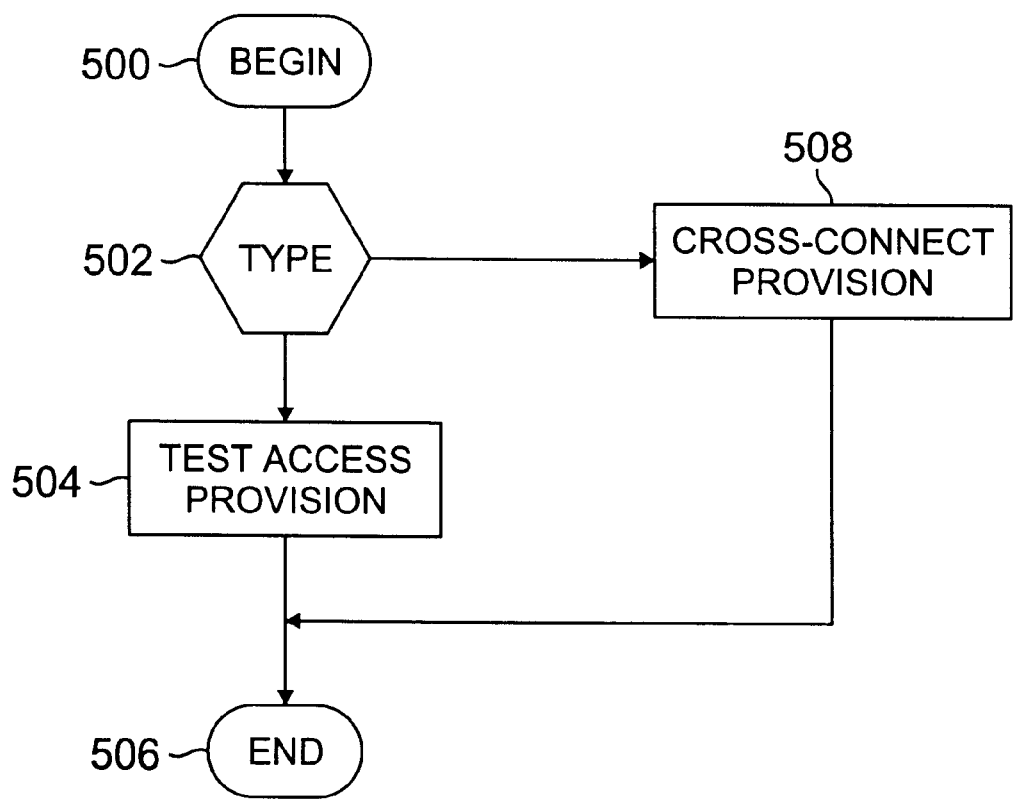
FIG. 5 is a flow chart illustrating the flow of a process in which a user selects applications within an interactive provisioning system.

The flow chart of FIG. 5 illustrates the overall flow of an interactive provisioning system in accordance with the principles of the present invention. The process begins in step 500 and proceeds to step 502 where a craft worker determines the type of provisioning application, for example test access, or cross-connect, is desired (Although test access and cross-connect provisioning are used as illustrative examples of an interactive provisioning system in accordance with the principles of the present invention, other types of provisioning contemplated within the scope of the invention). This selection process may be performed using a dialog box, menus, or keyboard entry, for example. If a test application is desired, the process proceeds to step 504 where the interactive provisioning system provides access to the provisioning of network element resources using graphical templates. In accordance with the principles of the present invention, the provisioning system may employ a "wizard" to step a craft worker through the provisioning process. Wizards are known and discussed, for example, in U.S. Pat. No. 5,924,101 entitled, "USER INTERFACE FOR CREATING CLASS DEFINITIONS AND IMPLEMENTA- TIONS FOR DATASTORE PRESISTENT OBJECTS", issued to Bach, et. al, which is hereby incorporated by reference. Once network element resources are provisioned for test access, the process may proceed to end in step 506. If, in step 502, the craft worker elects a cross-connect provisioning, the process proceeds from step 502 to step 508 where the cross-connect is effected, much as the test access provisioning of step 504. Once network element resources are provisioned for the cross connect application, the process proceeds from step 508 to end in step 506.

Figure 6:
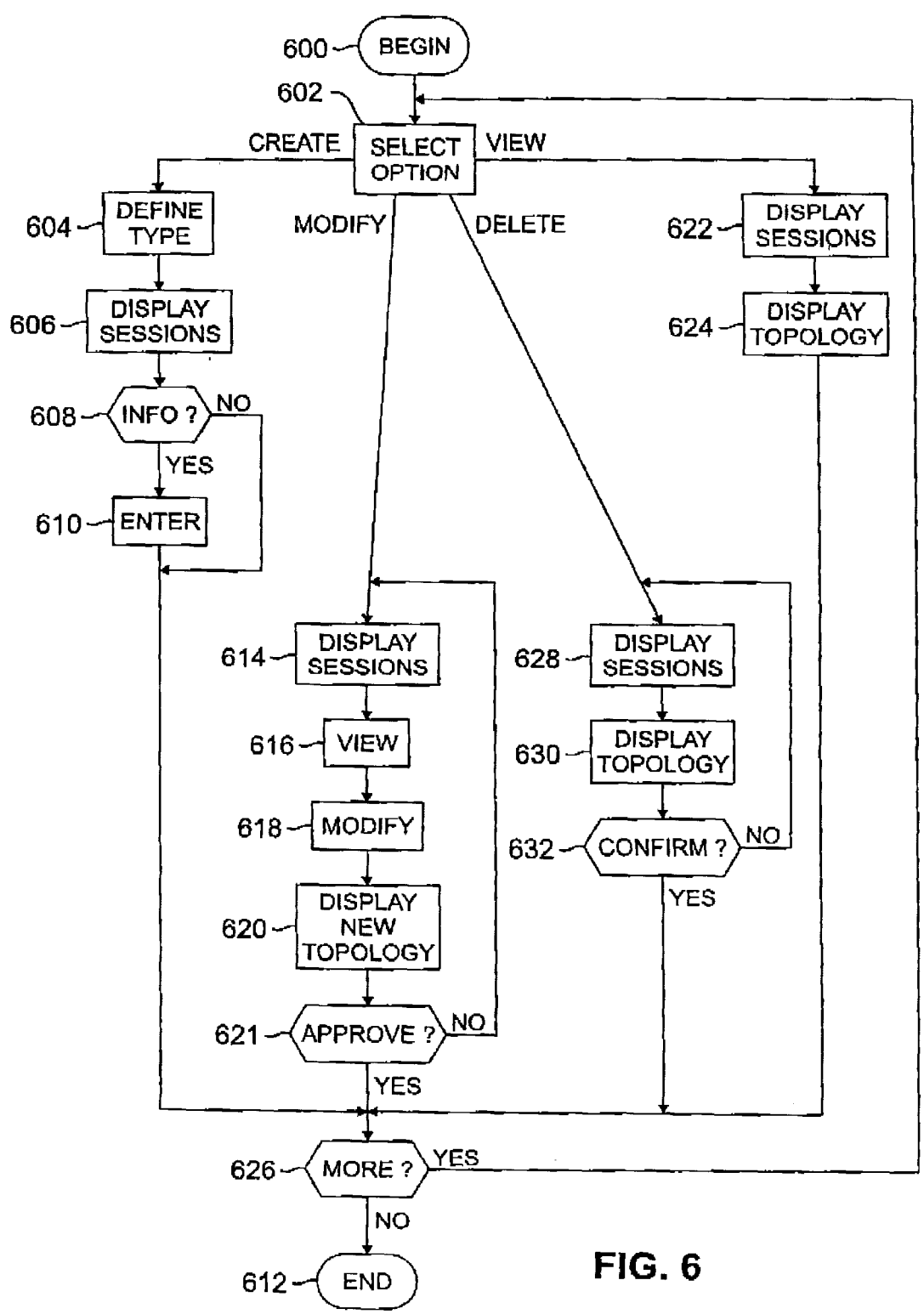
FIG. 6 is flow chart illustrating the flow of a process in which a user employs an interactive provisioning system for a test access application.

The flow chart of FIG. 6 provides a more detailed view of an illustrative embodiment of the test access provisioning of step 504, in which the process begins in step 600 and proceeds to step 602 where the interactive provisioning system provides options to a user in the form of a menu, for example, that allows the user to select among creating, modifying, viewing, or deleting a test access provisioning. An illustrative graphical representations of the menu is shown in the display output of FIG. 8. If the user selects "create" the process proceeds to step 604 where the user is prompted to enter whatever data is necessary to define the desired test access topology. For example, a user may be prompted to enter two tributary identifications for a mode in which traffic between nodes E and F are monitored. After defining the desired topology in step 604, the process proceeds to step 606 where the interactive provisioning system displays a graphical representation of the desired topology, with blanks left for a user is to fill in information, such as bay, port, tributary information, for example, indicating the desired connectivity. The interactive provisioning system may allow a user to supply such information through keystroke entry or through a selection tree at the user's option, for example. Selection trees are known controls that allow hierarchically-related objects to be displayed as an expandable outline. From step 606 the process proceeds to step 608 where the provisioning system determines whether additional information, such as the mode and rate for the test access session, is required. If more information is required, the process proceeds to step 610 where the interactive provisioning system prompts a user to enter the required information. From step 610 the process proceeds, as it would from step 608 if no further information were required, to end in step 612. Sample output screens are provided in the illustrated embodiments of FIGS. 8 through 11 in which a user is offered additional constraints (FIG. 9) for topology selection, the system provides the option of "filling in the blanks" (FIG. 10) for the selection of nodes, or is allowed to select nodes through use of as selection tree (as in FIG. 11), for example.

In this illustrative embodiment, the test access modes include:

Monitor E tributary

Monitor F tributary

Monitor E and F tributaries

Split "E" connection ("splice" with test access port)

Split "F" connection ("splice" with test access port)

Split "E" and "F" connection ("splice" with test access ports)

Split "A" connection ("splice" with test access port)

Split "B" connection ("splice" with test access port)

Split "A" and "B" connection ("splice" with test access ports)

If, in step 602 a user selects the "modify" option, the process proceeds from step 602 to step 614 where the provisioning system displays a test access modification screen which prompts the user to enter data that indicates which of the ongoing test access sessions is to be modified and permits a user to select one of the sessions for modification. In the illustrative embodiment of FIG. 13, the test modification screen takes the form of a browser window that lists all the sessions for a user-specified equipment, for example, all the sessions in bay 1 shelf 1, as indicated by the identifier AID 1—1 in this example. From step 614 the process proceeds to step 616 where the provisioning system provides the user with the option of viewing the topology of the session selected in step 614. The displayed topology may take the form, for example, of the template of FIG. 14 in which, as will be described in greater detail in the discussion related to FIG. 15, windows contain information identifying the provisioned nodes (The nodes could be defined at various levels of granularity, such as pots, or tributaries. Tributaries are used in this illustrative embodiment,) and, through connecting lines, the manner in which they are connected. The process then proceeds to step 618 where the provisioning system provides a display, such as in FIG. 15 with which a user may select a new test access mode for the selected session. After selecting the new test access mode the process proceeds to step 620 where the provisioning system displays the newly selected topology, such as in FIG. 16. The process then proceeds to step 622 where the provisioning system awaits approval of the modified test access session from the user. If the approval is forthcoming, the process proceeds to end in step 612, otherwise, the process returns to step 614 and proceeds from there as previously described.

If, in step 602 a user selects the "view" option, the process proceeds from step 602 to step 622 where the provisioning system displays a test access session screen which prompts the user to enter data that indicates which of the ongoing test access sessions is to be viewed and permits a user to select one of the sessions for viewing. In the illustrative embodiment of FIG. 13, the test modification screen takes the form of a browser window that lists all the sessions for a user-specified equipment, for example, all the sessions in bay 1 shelf 1, as indicated by the identifier AID 1—1 in this illustrative embodiment. After selecting the session in step 622 the process proceeds to step 624, where the provisioning system displays further detail regarding the topology of the session of interest at a user's option. From step 624 the process proceeds to step 626 where the provisioning system awaits an indication from the user as to whether the user wishes to view, modify, create, or delete more sessions, in which case the process returns to step 602, or to end in step 612.

If, in step 602 a user selects the "delete" option, the process proceeds from step 602 to step 628 where the provisioning system displays a test access session screen which prompts the user to enter data that indicates which of the ongoing test access sessions is to be deleted and permits a user to select one of the sessions for viewing. In the illustrated embodiment of FIG. 13, the test modification screen takes the form of a browser window that lists all the sessions for a user-specified equipment, for example, all the sessions in bay 1 shelf 1, as indicated by the identifier AID, 1—1 in this illustrative embodiment. After selecting the session in step 628 the process proceeds to step 630, where the provisioning system displays the topology of the session of interest. From step 630 the process proceeds to step 632 where the provisioning system awaits confirmation from the user that the session selected in step 628 is indeed the session the user wishes to delete. Upon receiving confirmation, the process proceeds to end in step 612, otherwise the process return to step 602. In any of the modes the provisioning system may proceed to step 626 to permit a user to return to step 602 and from there as previously described, before proceeding to end in step 612.

Figure 7:
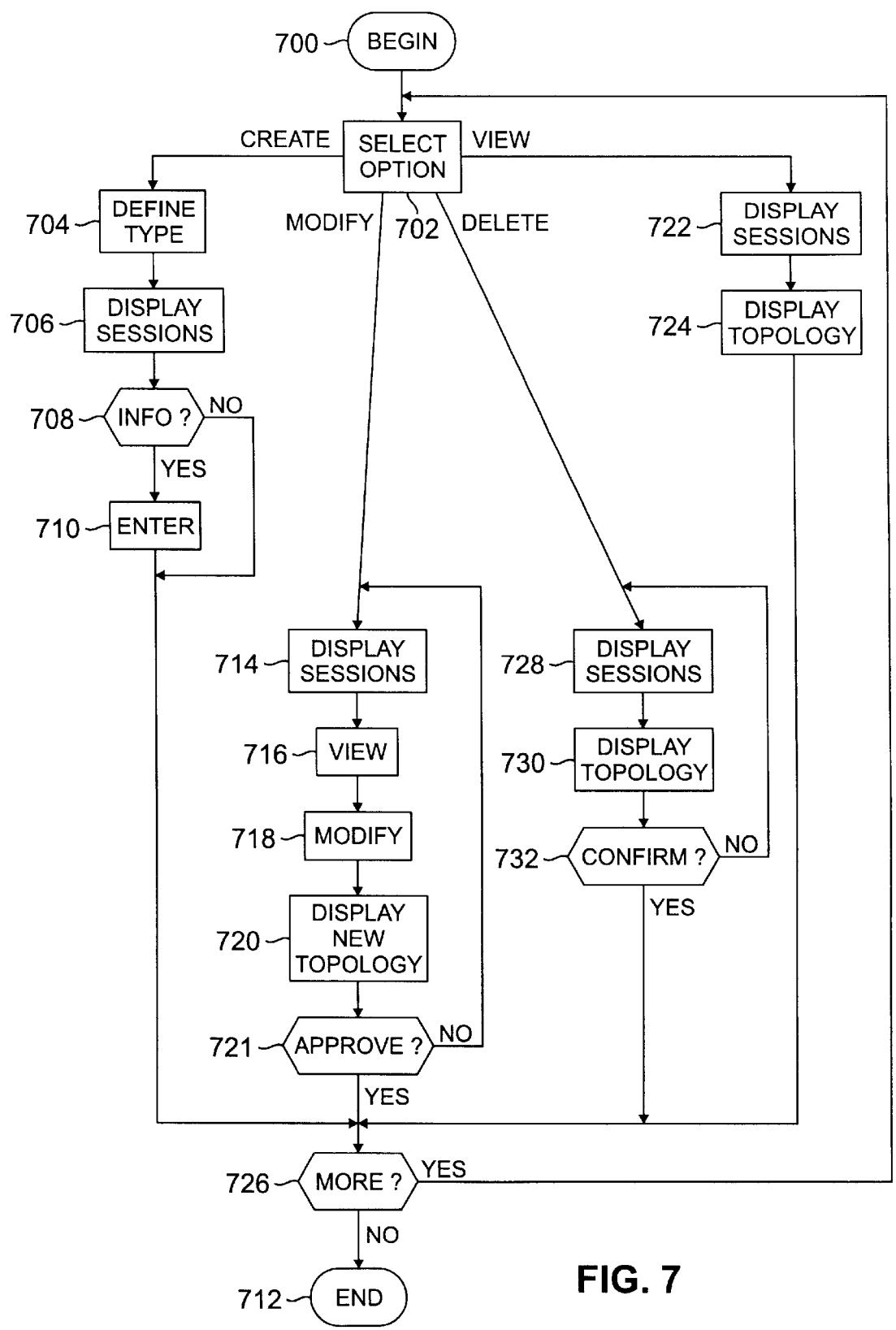
FIG. 7 is flow chart illustrating the flow of a process in which a user employs an interactive provisioning system for a cross connection application; and the sample screens of FIGS. 8 through 20 illustrate a variety of interactive provisioning display outputs in accordance with the principles of the present invention.

The flow chart of FIG. 7 provides a more detailed view of an illustrative embodiment of the cross connect provisioning of step 508, in which the process begins in step 700 and proceeds to step 702 where the interactive provisioning system provides options to a user in the form of a menu, for example, that allows the user to select among creating, modifying, viewing, or deleting a cross connect provisioning. An illustrative graphical representations of a similar test access menu is shown in the display output of FIG. 8. If the user selects "create" the process proceeds to step 704 where the user is prompted to enter whatever data is necessary to define the desired cross connect topology. After defining the desired topology in step 704, the process proceeds to step 706 where the interactive provisioning system displays a graphical representation of the desired topology, with blanks left for a user is to fill in information, such as bay, port, tributary information, for example, indicating the desired connectivity. The interactive provisioning system may allow a user to supply such information through keystroke entry or through a selection tree at the user's option, for example. From step 706 the process proceeds to step 708 where the provisioning system determines whether additional information, such as the mode and rate for the cross connect session, is required. If more information is required, the process proceeds to step 710 where the interactive provisioning system prompts a user to enter the required information. From step 710 the process proceeds, as it would from step 708 if no further information were required, to end in step 712. Sample output screens are provided in the illustrative embodiments of FIGS. 8 through 20 in which a user is offered additional constraints (FIG. 9) for topology selection, the system provides the option of "filling in the blanks" (FIG. 10) for the selection of nodes, or is allowed to select nodes through use of as selection tree (as in FIG. 20), for example. Note that in the cross-connect application, the provisioning system also indicates, as in FIG. 20, whether a node is available.

Cross connect modes in this illustrative embodiment include:

One-way point to point

Two-way point to point

One-way path protected

Two-way path protected

One-way adjunct path protected

UPSR/SNCP Ring Add, Drop

UPSR/SNCP Ring to Ring, Single Node Interconnection, Same NE

Ring interworking, Drop and Continue, BLSR/MS-SPRing Primary Node

Ring interworking, Drop and Continue, BLSR/MS-SPRing Primary Node in SameNE

Multi-cast

If, in step 702 a user selects the "modify" option, the process proceeds from step 702 to step 714 where the provisioning system displays a cross connect modification screen which prompts the user to enter data that indicates which of the ongoing cross connect sessions is to be modified and permits a user to select one of the sessions for modification. In the illustrative embodiment of FIG. 14, the test modification screen takes the form of a browser window that lists all the sessions for a user-specified equipment, for example, all the sessions in bay 1 shelf 1, as indicated by the identifier AID 1—1 in this example. From step 714 the process proceeds to step 716 where the provisioning system provides the user the option the topology the session selected in step 714. The displayed topology may take the form, for example, of the template of FIG. 15 in which, as will be described in greater detail in the discussion related to FIG. 15, windows contain information identifying the provisioned nodes (As in the test access application, the nodes could be defined at various levels of granularity, such as ports, or tributaries. Tributaries are used in this illustrative embodiment.) and, through connecting lines, the manner in which they are connected. The process the proceeds to step 718 where the provisioning system provides a display, such as in FIG. 16 with which a user may select a new cross connect mode for the selected session. After selecting the new cross connect mode the process proceeds to step 720 where the provisioning system displays the newly selected topology, such as in FIG. 17. The process then proceeds to step 722 where the provisioning system awaits approval of the modified cross connect session from the user. If the approval is forthcoming, the process proceeds to end in step 712, otherwise, the process returns to step 714 and proceeds from there as previously described.

If, in step 702 a user selects the "view" option, the process proceeds from step 702 to step 722 where the provisioning system displays a cross connect session screen which prompts the user to enter data that indicates which of the ongoing cross connect sessions is to be viewed and permits a user to select one of the sessions for viewing. In the illustrative embodiment of FIG. 14, the test modification screen takes the form of a browser window that lists all the sessions for a user-specified equipment, for example, all the sessions in bay 1 shelf 1, as indicated by the identifier AID 1—1 in this illustrative embodiment. After selecting the session in step 722 the process proceeds to step 724, where the provisioning system displays greater detail regarding the topology of the session of interest at the user's option. From step 724 the process proceeds to step 726 where the provisioning system awaits an indication from the user as to whether the user wishes to view, modify, create, or delete more sessions, in which case the process returns to step 702, or to end in step 712.

If, in step 702 a user selects the "delete" option, the process proceeds from step 702 to step 728 where the provisioning system displays a cross connect session screen which prompts the user to enter data that indicates which of the ongoing cross connect sessions is to be deleted and permits a user to select one of the sessions for viewing. In the illustrative embodiment of FIG. 14, the test modification screen takes the form of a browser window that lists all the sessions for a user-specified equipment, for example, all the sessions in bay 1 shelf 1, as indicated by the identifier AID 1—1 in this illustrative embodiment. After selecting the session in step 728 the process proceeds to step 730, where the provisioning system displays the topology of the session, of interest. From step 730 the process proceeds to step 732 where the provisioning system awaits confirmation from the user that the session selected in step 728 is indeed the session the user wishes to delete. Upon receiving confirmation, the process proceeds to end in step 712, otherwise the process returns to step 702. In any of the modes the provisioning system may proceed to step 726 to permit a user to return to step 702 and from there as previously described, before proceeding to end in step 712.

Figure 8:
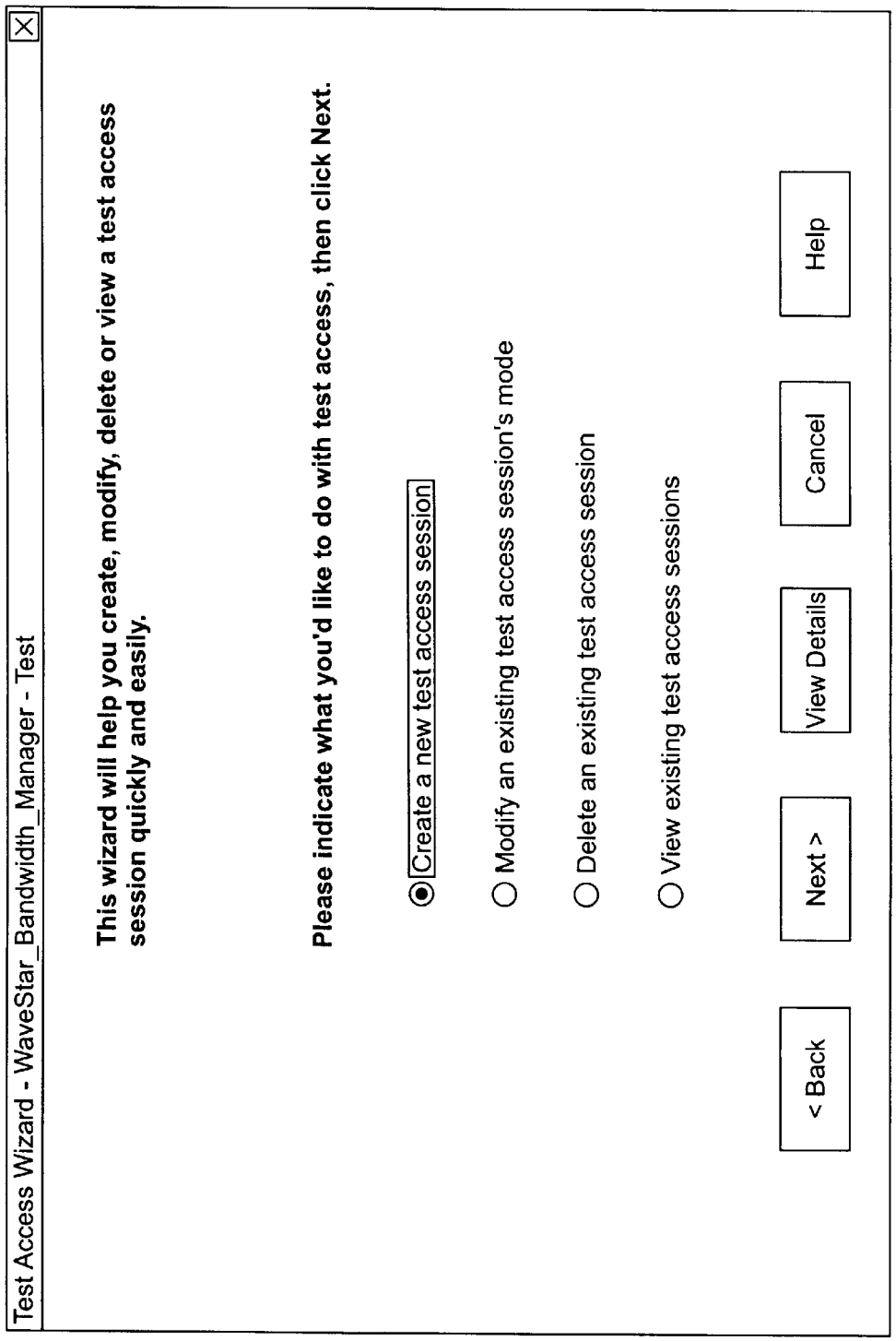
Figure 9:
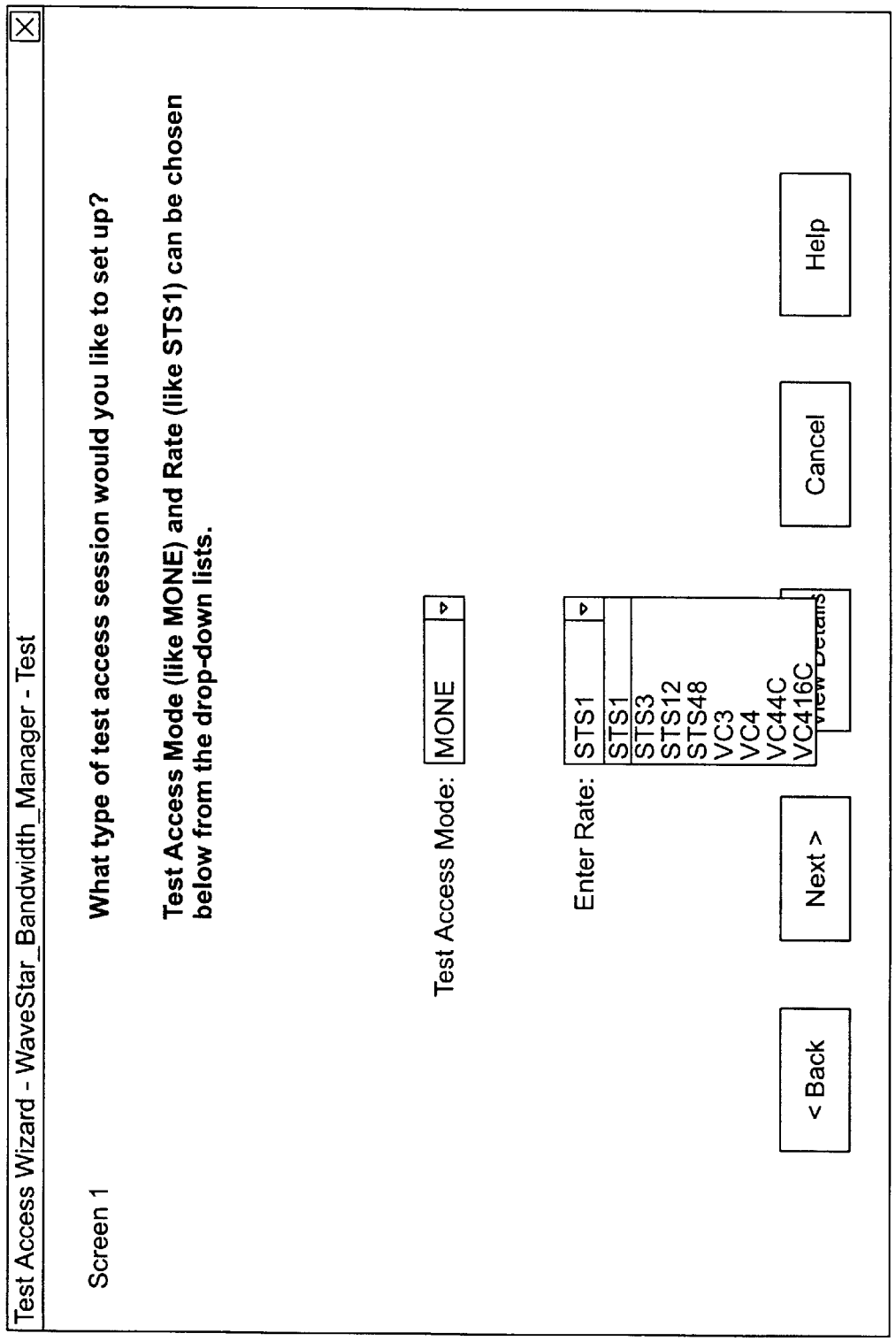
Figure 10:
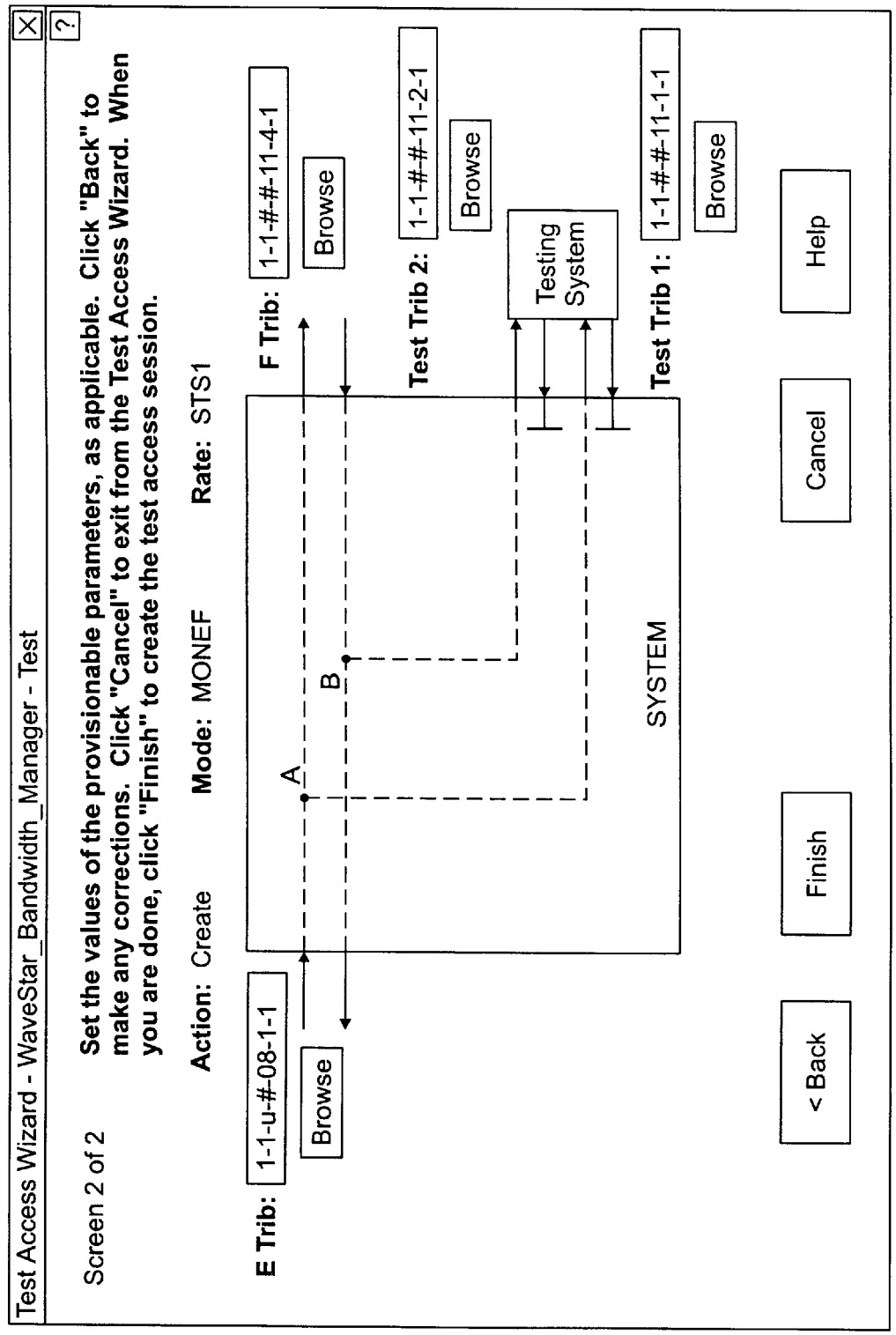
Figure 11:
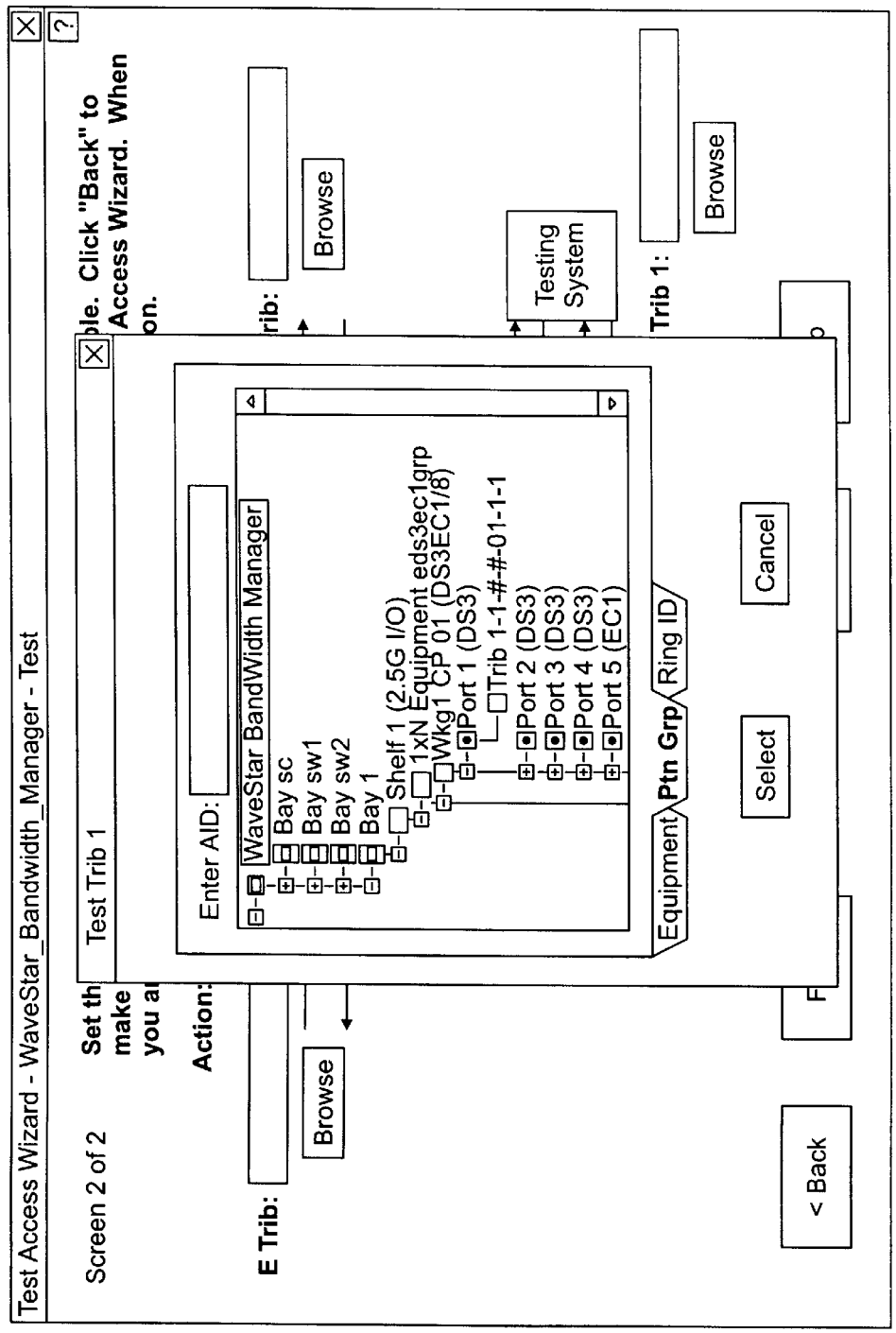
Figure 12:
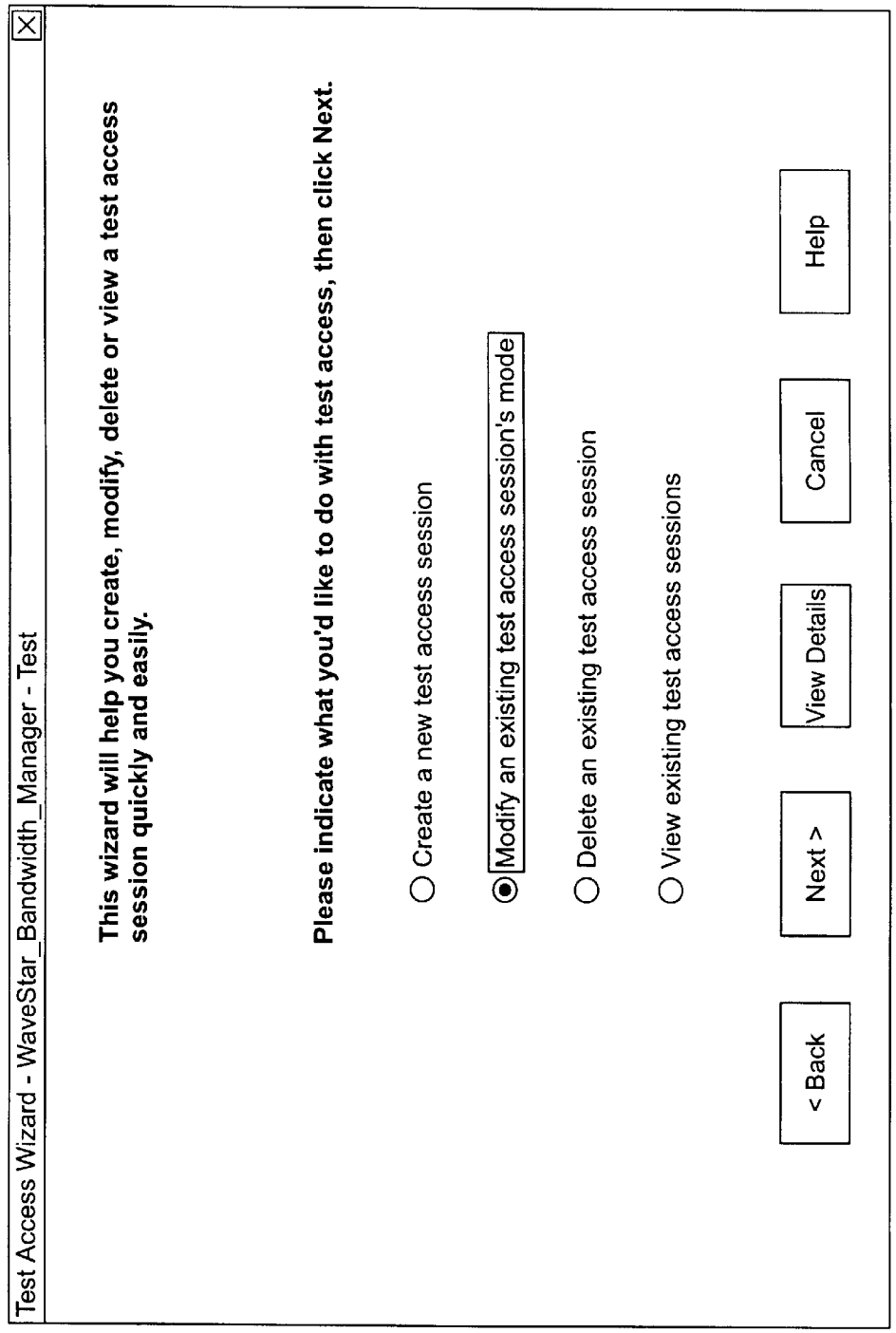
Figure 14:
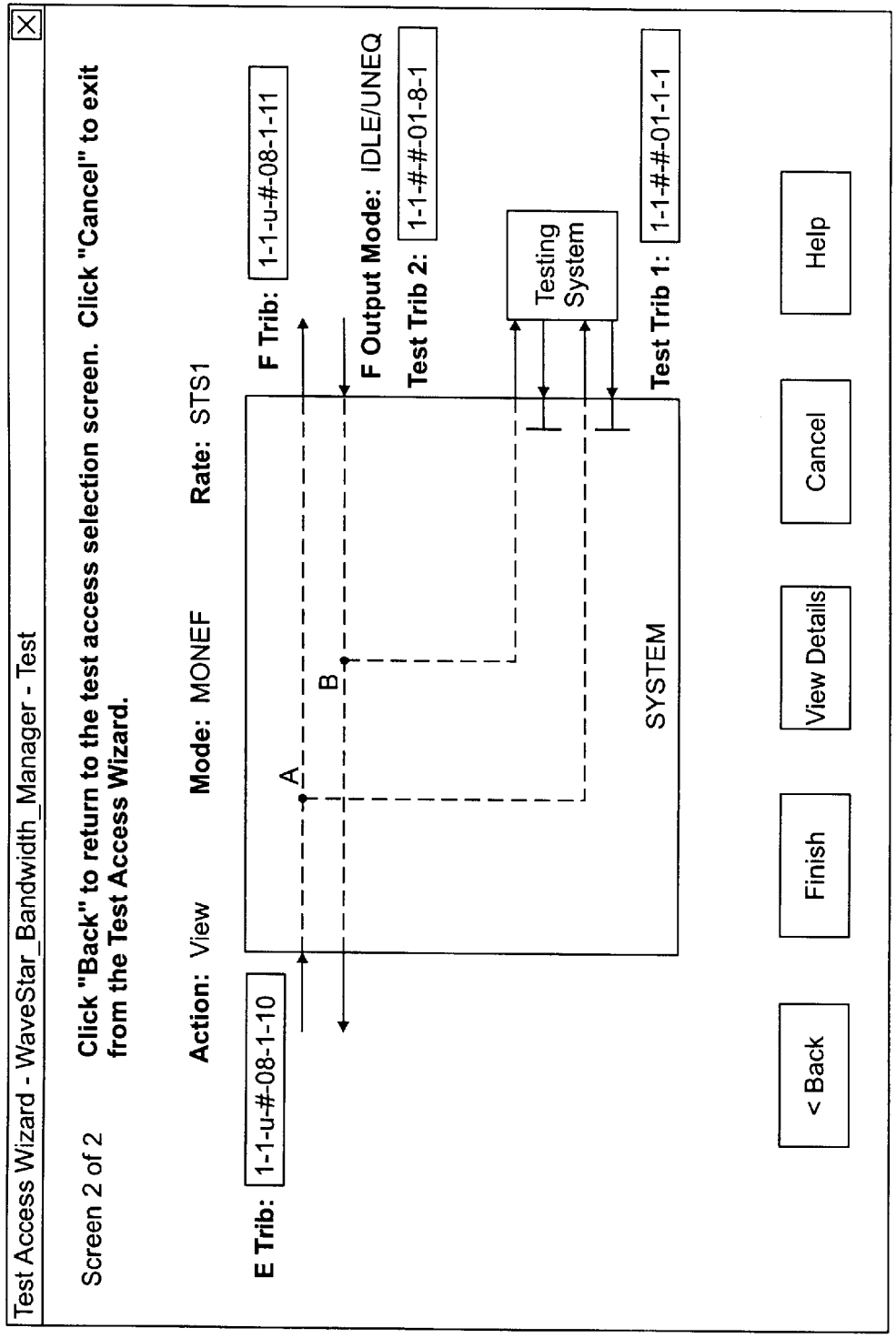
Figure 15:
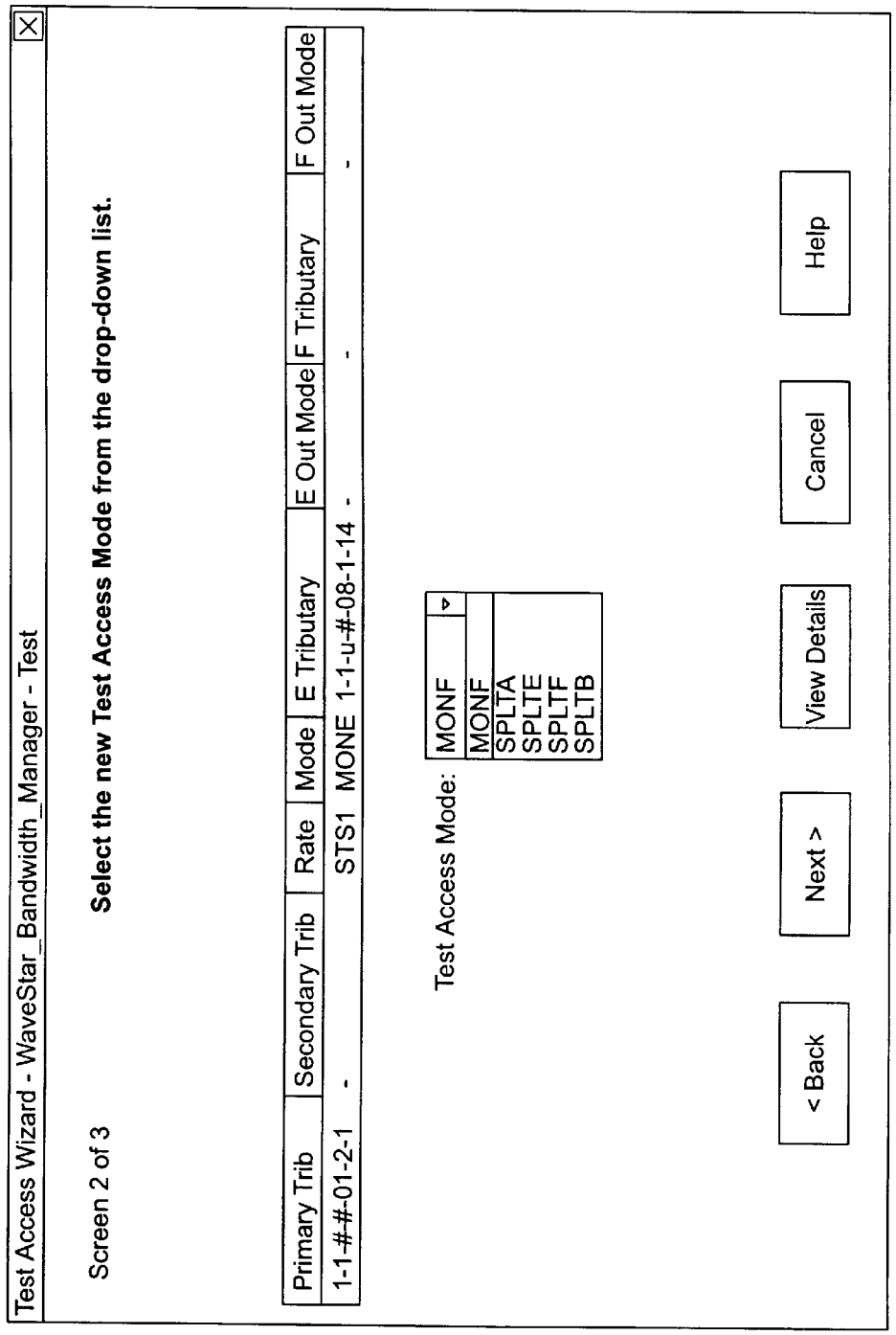
Figure 16:
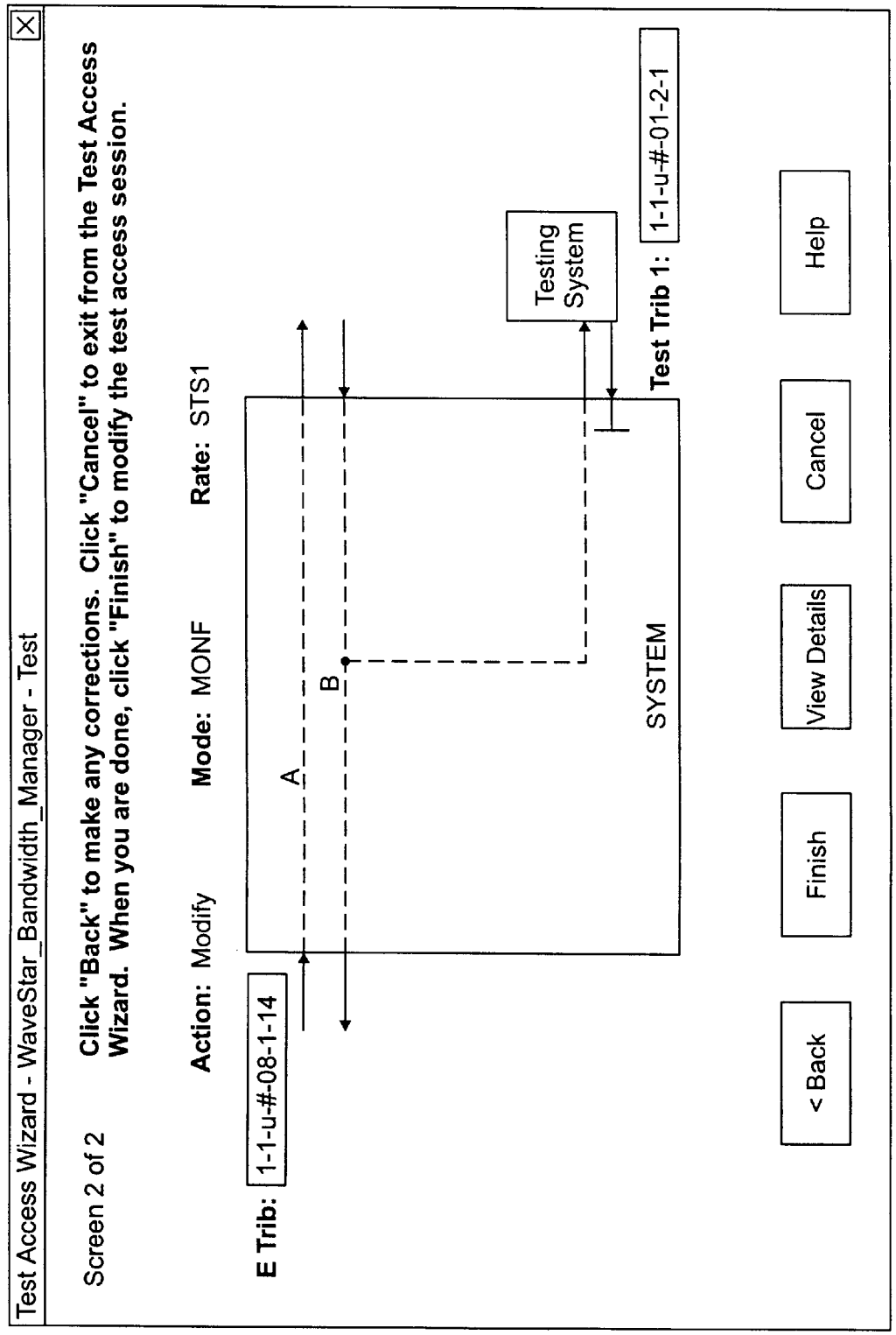
Figure 17:
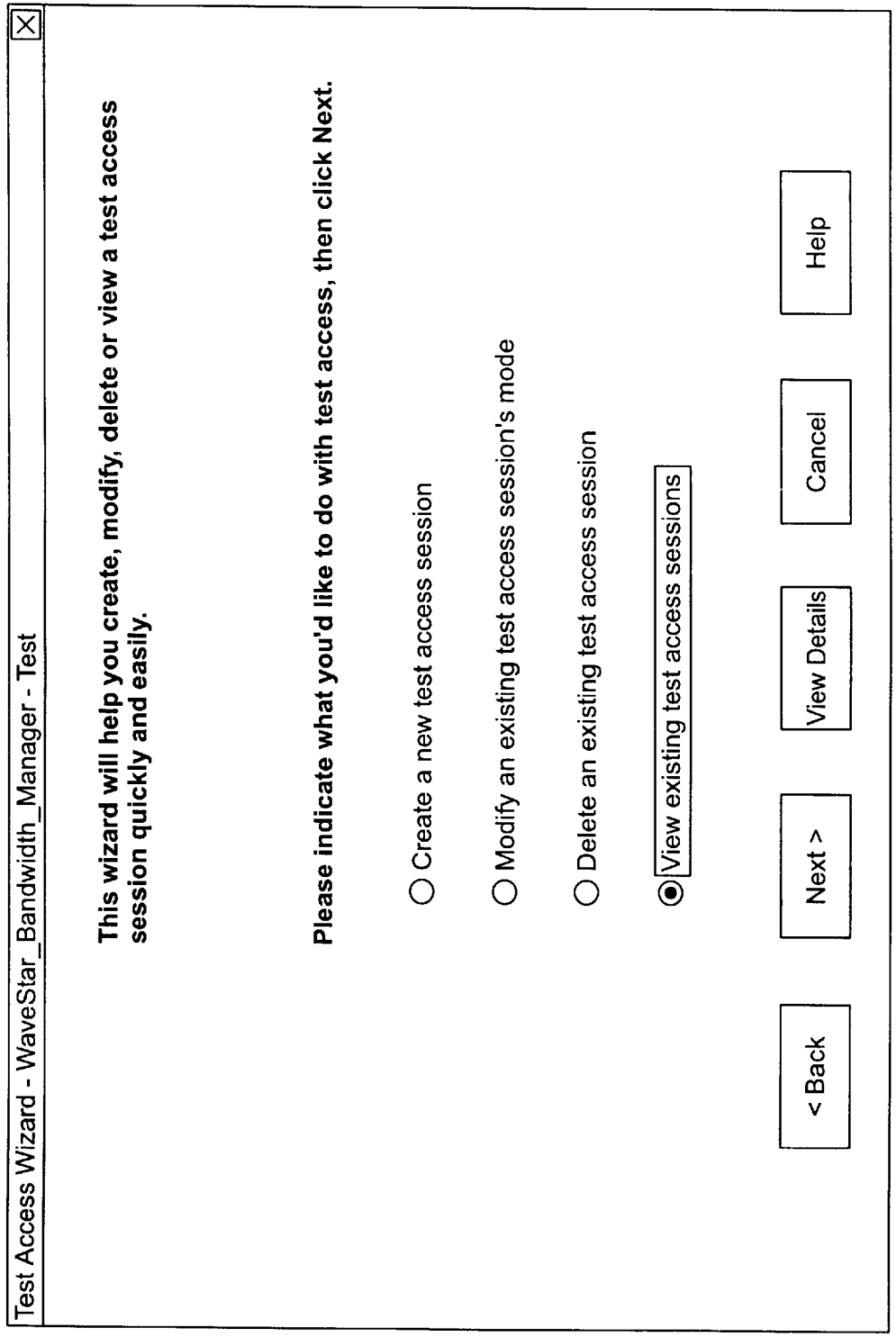
Figure 18:
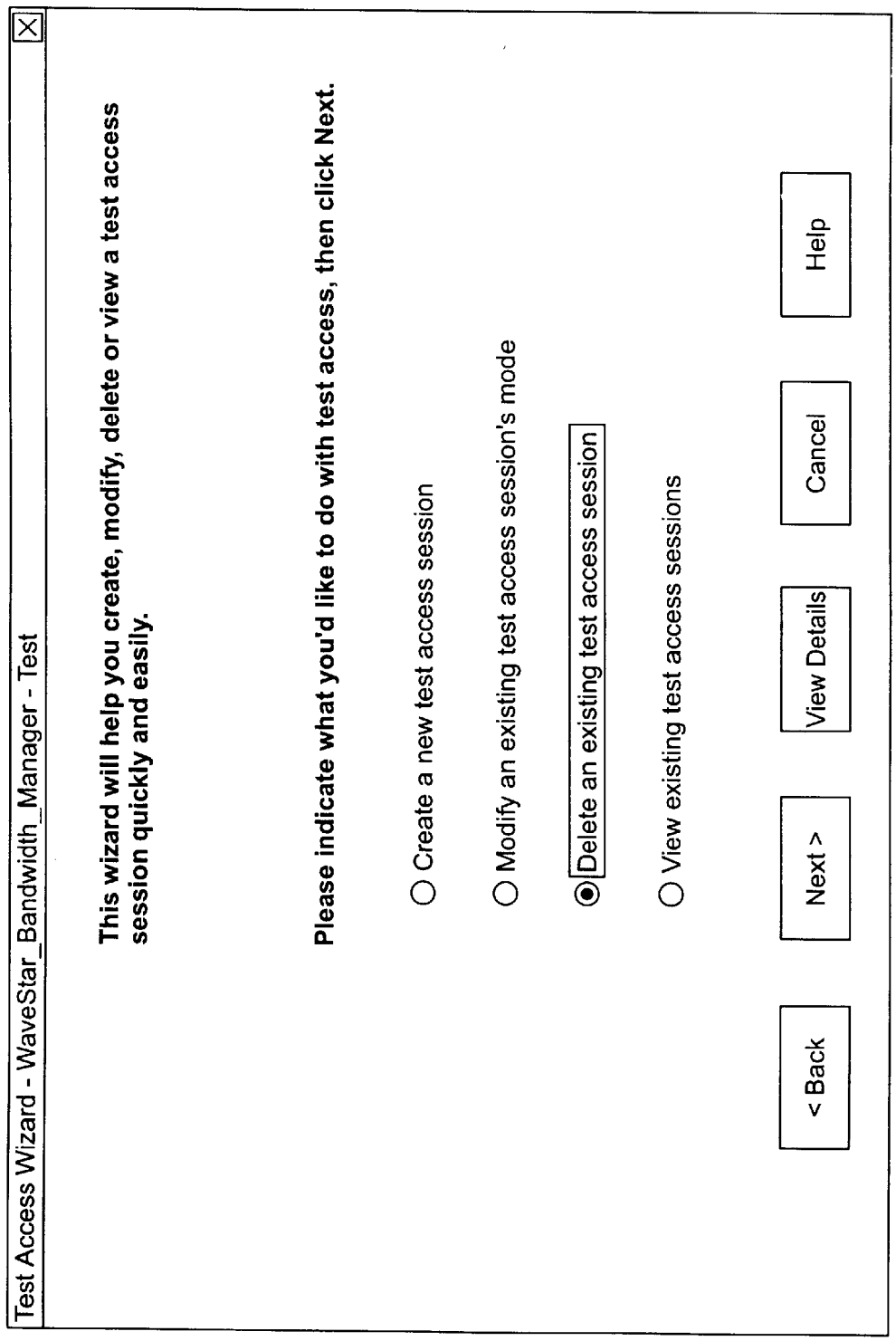
Figure 19:
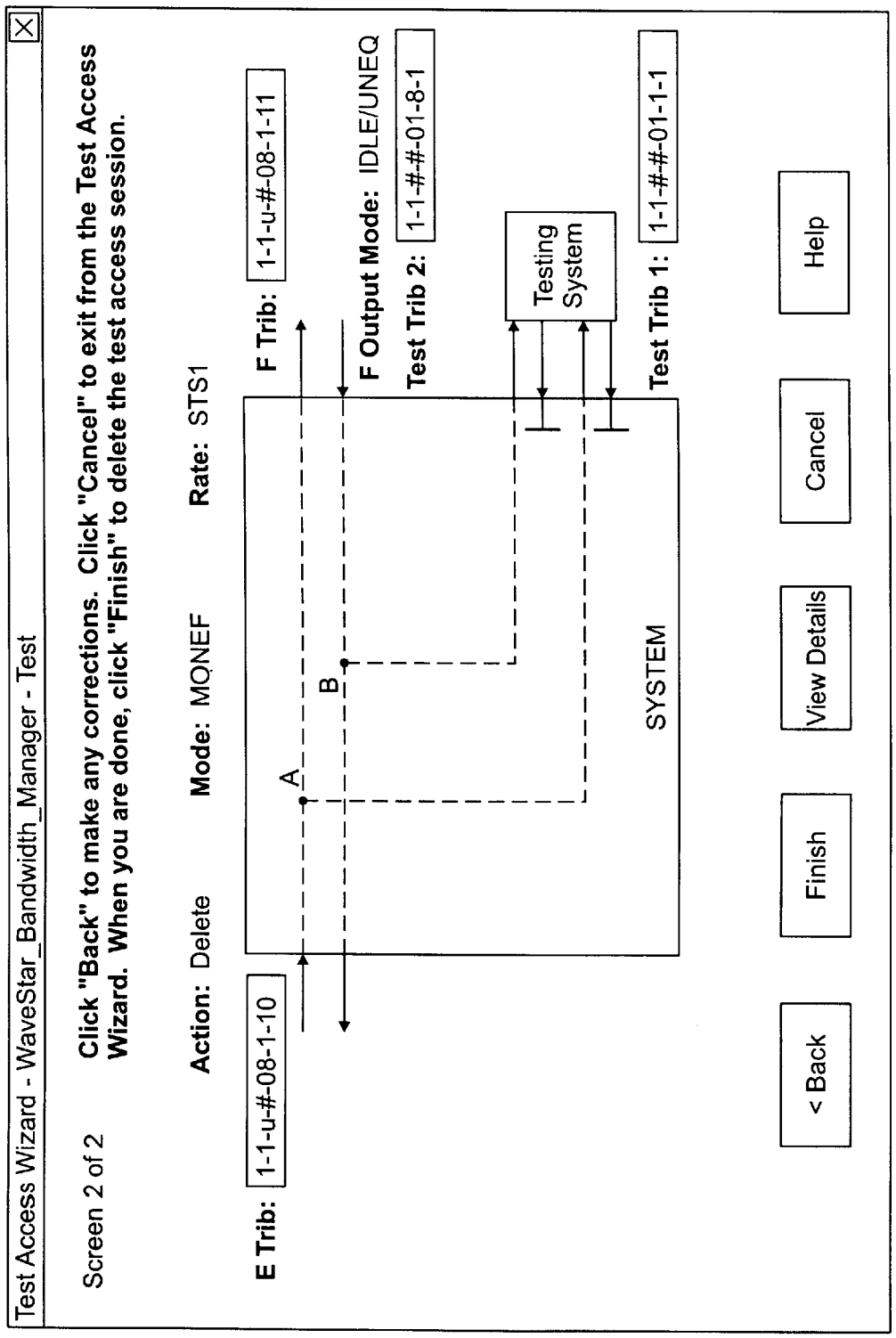

The sample screens of FIGS. 8 through 20 illustrate a variety of interactive provisioning display outputs in accordance with the principles of the present invention. Although some legends within some of the displays indicate that the display is related to a test access application, the screen configurations may be used for a variety of applications, including test access and cross-connection. FIG. 8 illustrates a screen interface that provides a user with the options of creating, modifying, deleting, or viewing existing sessions. FIG. 9 illustrates a screen that allows a user to select a mode as previously described. FIG. 10 illustrates a screen in which a topology template provides to a user a graphical indication of a system's interconnectivity by, for example, indicating that traffic flows from the E tributary to the F tributary. FIG. 11 illustrates a screen in which a decision tree is provided to a user for the selection of ports for entry into the E, F and test tributary "blanks" of a test access screen. FIG. 12 provides an illustration of a screen in which a user has selected the option of modifying an existing test access session's mode. FIG. 13 illustrates a display in which a browse button may be employed by a user to select a session. FIG. 14 illustrates a topology, as previously described. FIG. 15 illustrates a screen which permits a user to select a new test access mode from a drop-down list. FIG. 16 illustrates an updated topoloy. FIG. 17 provides an illustration of a display in which a user has selected the option of viewing an existing session. FIG. 18 illstrates a screen in which a user has selected the option of deleting an existing test access session. FIG. 19 illustrates a display in which a topology associated with the monitoring of "E" and "F" tributaries displayed. FIG. 20 illustrates a screen in which the availability of tributaries is illustrated, along with a decision tree.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 2, or transmittable to a computer system, via a modem or other interface device, such as communications adapter 190 connected to the network 195 over a medium 191. Medium 191 can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications an variation in of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An apparatus comprising:
    a display device, and
    a display controller configured to display a graphical representation of test access provisioning information and cross connect provisioning information in one or more display segments of the display device;
    wherein said test access provisioning information provides access for at least modifying, creating, viewing or deleting test sessions.

2. The apparatus of claim 1 wherein the displayed graphical representation is a template that includes area for accepting input from a user.

3. The apparatus of claim 2 wherein the controller is configured to display information related to viewing a provisioned session.

4. The apparatus of claim 2 wherein the controller is configured to display information related to modifying a provisioned session.

5. The apparatus of claim 2 wherein the controller is configured to display information related to deleting a provisioned session.

6. The apparatus of claim 2 wherein the controller is configured to display information related to creating a provisioned session.

7. The apparatus of claim 2 wherein the controller is further configured to display a wizard to a user to step the user through a provisioning process.

8. A method of displaying provisioning information comprising the steps of:
    (A) displaying a prompt in a display device for a user to select a provisioning application, and
    (B) displaying a graphical representation of test access provisioning information and cross connect provisioning information in one or more display segments of a display device, wherein said test access provisioning information provides access for at least modifying, creating, viewing or deleting test sessions.

9. The method of claim 8 wherein step (B) comprises the step of:
    (B1) displaying a template that is a graphical representation of a provisioning topology and that includes an area for accepting input from a user.

10. The method of claim 9 wherein the step (B) comprises the step of:
    (B4) displaying information related to viewing a provisioned session.

11. The method of claim 9 wherein the step (B) comprises the step of:
(B5) displaying information related to deleting a provisioned session.

12. The method of claim 9 wherein the step (B) comprises the step of:
(B6) displaying information related to modifying a provisioned session.

13. The method of claim 9 wherein the step (B) comprises the step of:
(B7) displaying information related to creating a provisioned session.

14. The method of claim 9 wherein the step (B) comprises the step of:
(B8) displaying a wizard to a user to step the user through a provisioning process.

15. The method of claim 9 further comprising the step of:
(C) displaying a decision tree for the selection of nodes to be provisioned.

16. The method of claim 9 further comprising the step of:
(D) displaying an indication of which nodes are available for provisioning.

* * * * *